Sept. 10, 1963
C. T. BREITENSTEIN
3,103,159
BEVERAGE BREWER
Filed Feb. 14, 1958
4 Sheets-Sheet 4
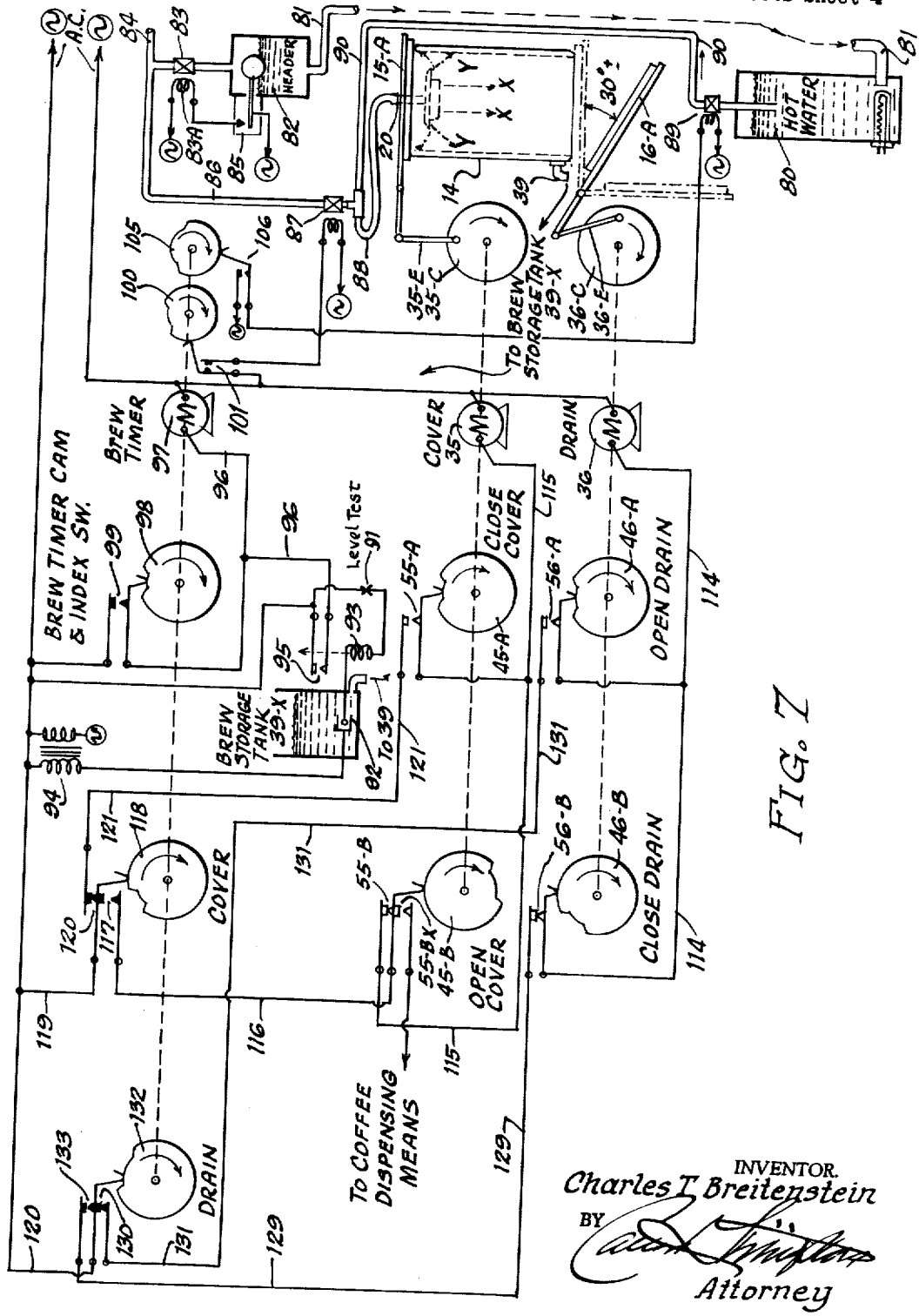
FIG. I
INVENTOR.
Charles T. Breitenstein
BY
Attorney

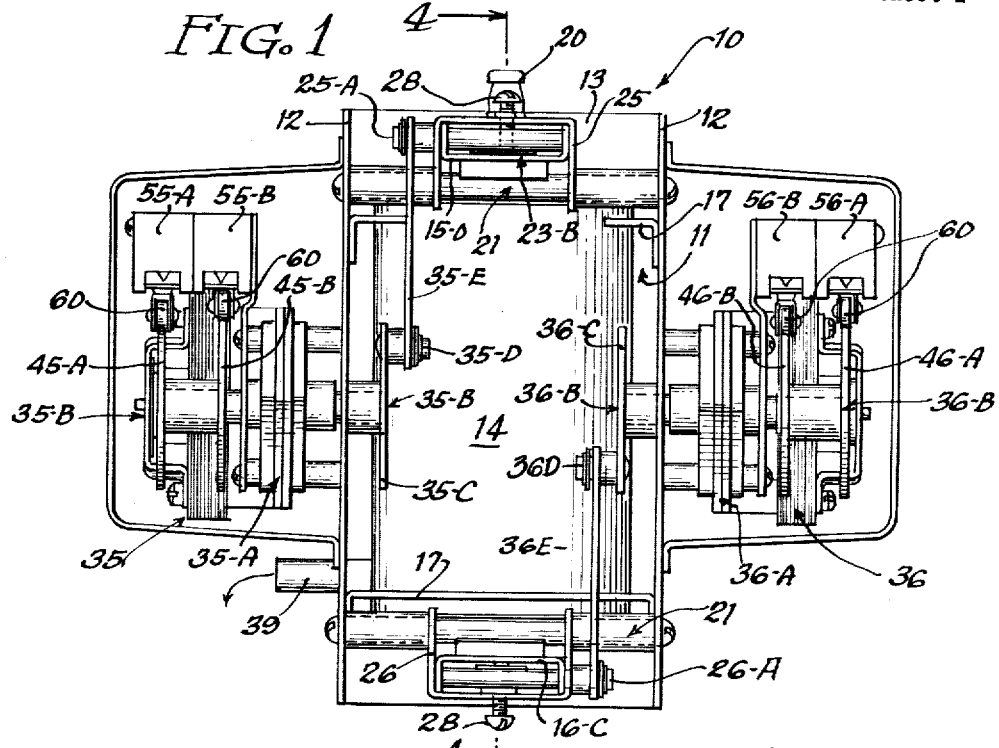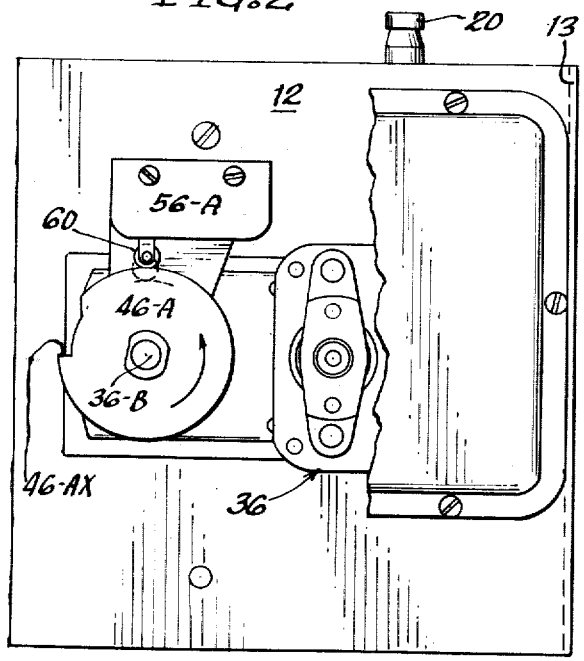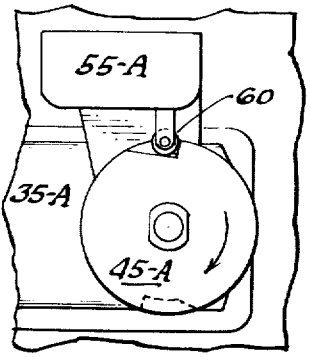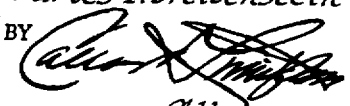

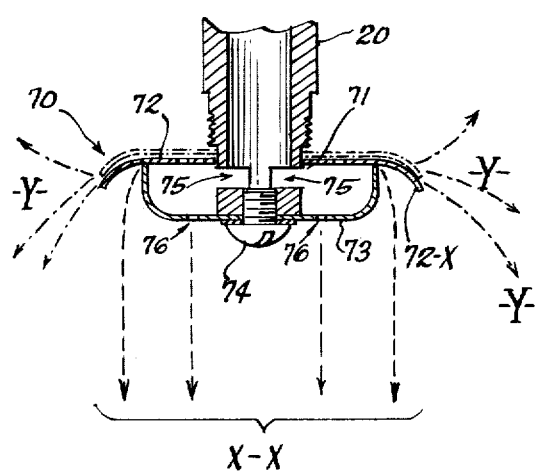
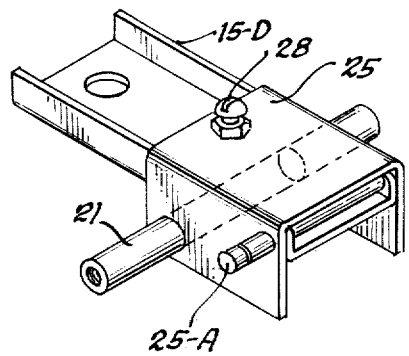
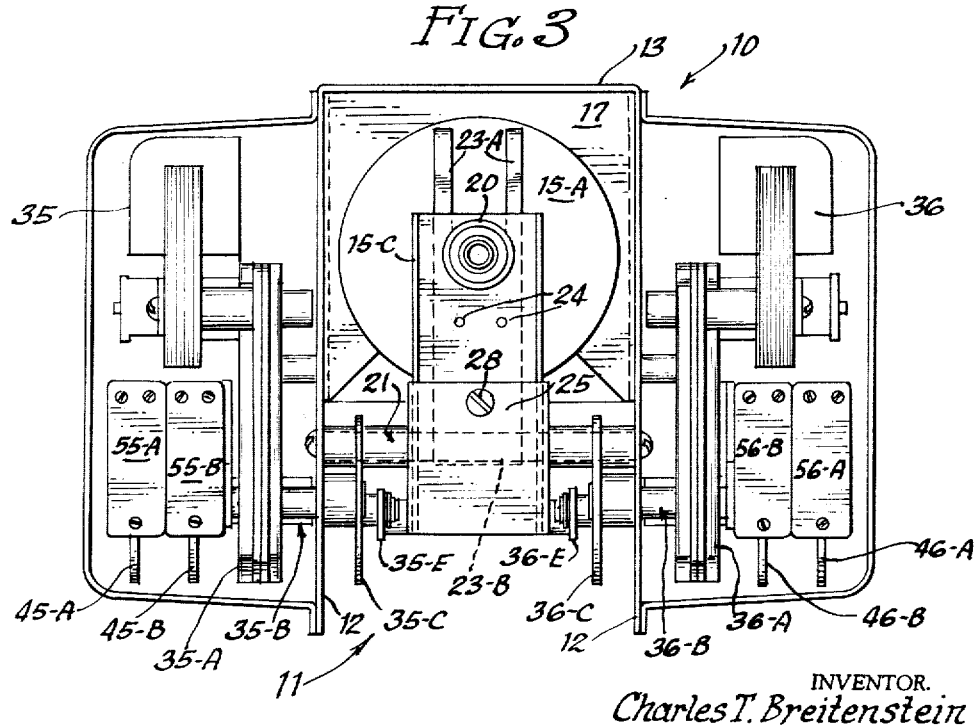

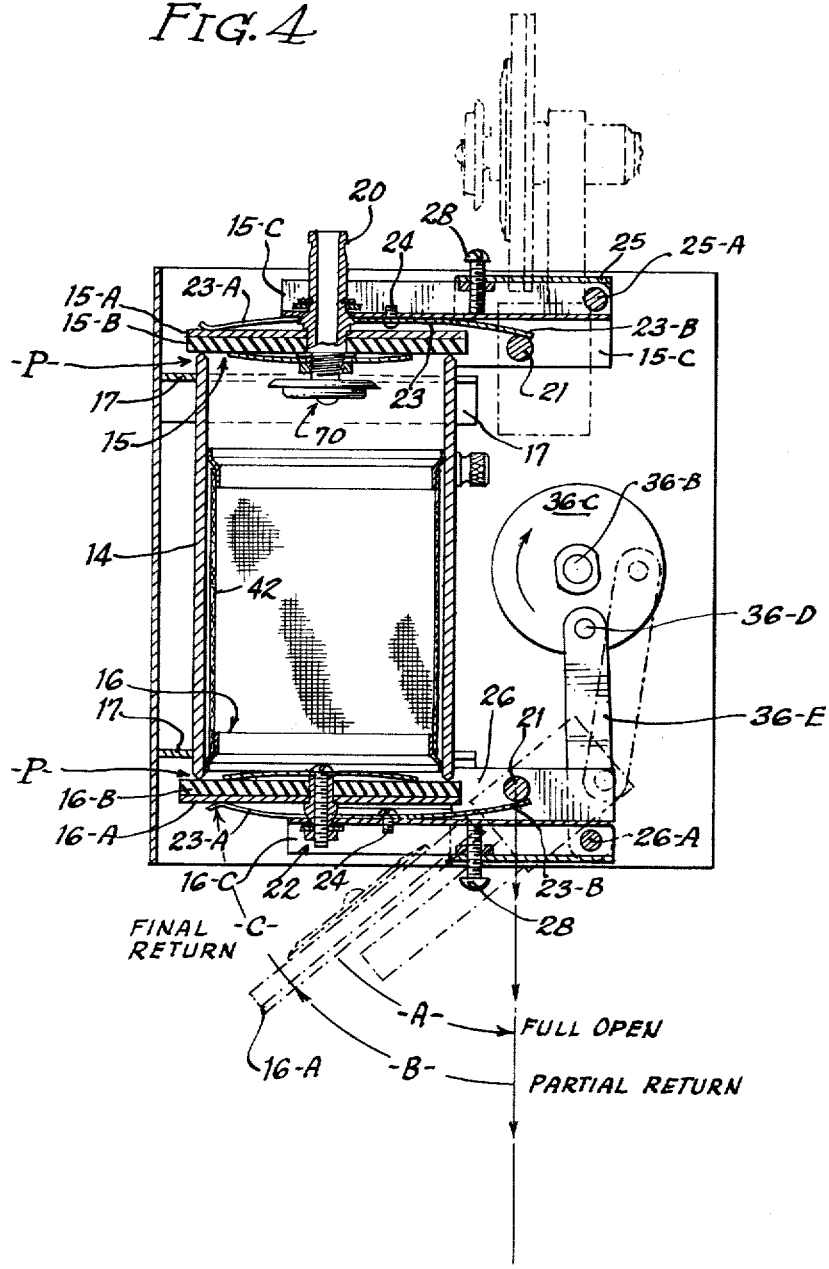

3,103,159
BEVERAGE BREWER

Charles T. Breitenstein, Chicago, Ill., assignor, by mesne assignments, to The Seeburg Corporation, Chicago, Ill., a corporation of Pennsylvania
Filed Feb. 14, 1958, Ser. No. 715,441
12 Claims. (Cl. 99—289)

The principal object of this invention is the provision of improvements in coffee brewing and like apparatus, particularly as used in automatic beverage dispensing machines.

More particularly, the disclosure provides improvements in brewer tanks of the open-ended variety having one or two endwise (usually upper and lower) ends equipped with closures for the admission of granulated coffee at one end, usually the top, and for discharge of spent grounds at the other end, usually the bottom.

One feature of the invention is the provision of a crank drive with a dead-center closed crank linkage which aids in procuring a firm seal when the closure top or bottom is seated home.

Another feature is the provision of a back-locking cam and switch means cooperable with the dead center crank means for preventing retrograde loosening of the closure-crank leverages when the dead-center lock-up condition is effected.

A further feature is the provision of an automatic spray head carried by the top closure and affording a central puddling flow of hot water into the brew charge, or a flushing spray for washing down the brewer chamber.

Still other objects and aspects of novelty and utility relate to details of the construction and operation of the closures and the control means for actuating and cycling the apparatus.

Additional objects and aspects of novelty and utility characterizing the invention will appear hereinafter as the following description proceeds in view of the annexed drawings, in which:

FIG. 1 is a front elevation of the brewing unit;
FIG. 2 is a side elevation with a cover plate broken away showing the top closure motor and cams;
FIG. 2-A is a fragmentary operating detail of cam and switch parts associated with the bottom closure on the side of the unit opposite from that of FIG. 2;
FIG. 3 is a top plan view of the brewer;
FIG. 4 is a vertical section taken along lines 4—4 of FIG. 1;
FIG. 5 is a perspective detail of the pivotal mounting for one of the closure rocker arms;
FIG. 6 is a sectional detail of the spray head;
FIG. 7 is a schematic operating and circuit diagram.

Referring to FIG. 1, the brewer unit consists of a U-shaped chassis or frame stamping 10 having an open vertical side 11 (FIG. 3) flanked by opposite vertical side walls 12 joined to a backwall 13.

A brewing tank 14 having upper and lower open ends 15 and 16 (FIG. 4) is secured in the chassis frame by means of upper and lower seating plates 17 spot-welded to the chassis (see FIG. 4 also).

As viewed in FIG. 4, the upper end of the brewing chamber or tank is provided with a closure or lid 15A having a resilient gasket means 15B seating on the appertaining upper rim portions of the tank.

A rocker arm 15C of channel shape cross-sectional has a punched free end portion freely embracing a central hose nipple 20 on the top closure so as to carry the latter loosely, the opposite end of this arm being rockably mounted on the chassis frame (FIGS. 1, 3 also) by an adjustable pivot means detailed in FIG. 5 and including a long cross pin 21 seated in the opposite chassis sidewalls 12 (FIG. 3), as will more fully appear in connection with FIG. 5 hereafter.

As depicted in FIG. 3, each end closure is provided with a fork-shaped spring blade 23 which has two long prongs 23A straddling the nipple 20 on the lid, for example (or the stud 22 on the bottom closure), to bear on radially outermost portions of the closure, the body of each spring being secured to its rocker arm by means of screws 24 (FIG. 4 also), while the opposite end 23B of each spring blade is biased to bear on its corresponding pivot 21, so that the appertaining closure member is spring-biased to cause the radially outermost margins thereof (relative to pivot 21) to cant toward the open edge of the tank (as at point P, FIG. 4) so as to engage the latter foremost in closing descent of the lid.

The construction of the top and bottom closures 15A and 16A is nearly identical, the exception being that the bottom member 16A has no hose nipple like the connection 20 on the top closure, although it does have a rocker nipple 22 for effecting an attachment to its rocker with a spring bias means like that on the lid. Otherwise the parts of the bottom closure mechanism which have literal suffixes, such as 16A, 16B, etc., correspond to like parts of the top structure having the same literal suffix, such as 15A, 15B, etc.

There is, however, an important functional difference for the bottom or drain closure in that the latter first moves to a fully open position and then moves back to an angular position (as in dotted lines, FIG. 4) at about 30°, as will be explained hereafter.

The rocker arm construction is detailed in part in FIG. 5 to show particularly the upper channel arm 15D, and the adjustable pivot mounting means therefor comprising a second channel piece 25 which is much shorter, but wider, than the main channel and which straddles the end of the rocker arm 15D. The corresponding short rocker channel for the bottom cover is indicated at 26 (FIGS. 1 and 4).

The long pivot pin 21 traverses the opposite sides of the short channel piece to support the latter for rocking motion, while a crank pin 25A (FIGS. 1, 3, 4, 5) passing through both channel pieces interconnects the same for rocking action, as will appear.

In order to adjust the spring tension for the rocker means, there is provided (in each short channel piece) a screw 28 treadable to bear down upon the main channel member to press the latter and the underlying spring tail 23B against the pivot pin 21.

Means for independently rocking the end closures from closed to open position and back, in their respective operating cycles, includes (FIG. 1) separate electric motors 35 and 36 each mounted on one of the sidewalls 12 and each provided with a small reduction gear unit 35A or 36A, from which extends a corresponding drive shaft 35B (or 36B) coupled with a corresponding crank disc 35C (or 36C), the eccentric pin 35D (or 36D) of which is attached to one end of a crank rod 35E (or 36E), the opposite end of which connects to the crank pin 25A of the lid, or in the case of the lower crank rod 36E to the bottom crank pin 26E.

Thus, as depicted in FIG. 4 in full lines, the bottom closure 16A is fully shut and the crank mechanism is in a dead-center condition. Upon energization of the bottom or drain motor 36 the appertaining closure will be displaced 90°, first to a fully open condition similar to that shown in dotted lines for the lid. Subsequently the bottom will be moved back to the 30° position until the crank disc and eccentric completes one revolution as a function of a subsequent cycling.

The fully open position of the bottom closure is a dumping position, in which the major contents (for instance coffee grounds) of the brewer tank or chamber 14 is rapidly discharged, while the intermediate angular position deflects the flushing water in a second phase of the loading and brewing cycle.

When the motor 35 is energized, the top closure 15A will be raised to open condition and closed at the completion of the crank cycle, as will more fully appear hereafter; and such open condition of the top corresponds to a loading or charging condition during which a beverage or like substance, for example fresh ground coffee, may be directed into the chamber, it being understood that during such an operation the bottom closure would be shut.

In accordance with the intended utilization of this type of brewer in a coffee dispensing machine the chamber or tank 14 is charged as aforesaid with ground coffee and the top closure is shut, following which hot water will be introduced for admixture therewith via the nipple 20, and after a predetermined brewing interval controlled by other apparatus of known character, alluded to more fully hereafter, the brew or liquid contents of the tank 14 will be drawn off from a discharge nipple 39, seen at the bottom of the tank in FIG. 1, this nipple leading out through the sidewall of the tank.

One of the important features of novelty of the disclosed structure is the introduction of the hot water centrally through the top closure of the tank 14 together with the provision of means including an automatic deflecting means or spray head 70 (FIG. 4) fed from said nipple 20, and acting to distribute the hot water uniformly and centrally downward to puddle into the body of the brew charge, whereby to effect a uniform and rapid extraction, the head also being capable of a different mode of operation for flushing the walls of the filter screen as will appear.

The construction of the spray means is shown in FIG. 6 wherein the nipple 20 at its lower end is reduced to provide a shank 71 on which an annular deflector 72 is vertically movable to the limit of the shoulder formed by the reduction.

Fitted against the lower end of the shank portion of the nipple 20 is a cylindrical cup member 73 retained by a screw 74 threaded into the shank, the sidewall of this cup being dimensioned in the height of its rim to permit the deflector to move up and down about $\frac{1}{32}$ inch, the weight of the deflector normally causing same to seat down upon the rim of the cup.

Near the end of the nipple shank are two milled slots 75 serving as efflux orifices for water admitted through a hose connection with the top of the nipple.

As will more fully appear hereinafter, water is delivered to the spray head at selected pressures, one for brewing, and another for flushing.

For brewing purposes, hot water enters the nipple 20 at a pressure which is lower than that in the water mains, and which upon entering the cup 73 through orifices 75 barely displaces the deflector 72 to permit the water to trickle over the rim and sidewalls of the cup and thence directly downward in a curtain indicated by the dotted lines X—X (FIG. 4 also) onto the charge of coffee to puddle in the latter and filter downwardly and outwardly therethrough from a substantially central area.

However, for flushing purposes, the water delivered to the nipple 20 comes directly from the main at a pressure which fully unseats the deflector 72 so that the water is forced outwardly over the rim of the cup against the angled lip 72X of the deflector and out along the dash-dot lines Y—Y to spray against the upper wall portions of the cylindrical mesh insert strainer 42 used in the tank to flush away all residual grounds. Trickle holes 76 may also be provided in the cup bottom.

A further important feature of the disclosure relates to the electro-mechanical control for back-locking the dead-center closing action of the eccentric system. To this end, the two motor drive shafts 35B, 36B (FIGS. 1 and 3) are extended and each provided with a pair of switch cams 45A, 45B and 46A, 46B, respectively, each of said cams having associated with it a switch 55A, 55B, or 56A, 56B, and each switch having a corresponding operating member provided with a cam roller 60 riding on the appertaining cam and capable only of up and down motion.

Referring to FIG. 2 and the cam 46A and roller 60 there shown, it will be noted that the cam slot has a radially straight end margin 46AX which is adapted, in the dotted-line closed condition of the corresponding bottom closure, as shown schematically in FIG. 7, or the full-line position of FIG. 4, to abut the associated switch roller 60 on switch 56A and thereby lock the shaft 36B, and hence the associated eccentric disc and crank means 36C, 36E against retrograde displacement, this abutting condition occurring when the switch cam is in the position corresponding to the dead-center position of the crank mechanism, as a result of which the associated closure member 15A will be secured in tightly sealed condition against its resilient gasket means 15B, as in FIG. 4.

The locked-up condition of the cam switch means is also illustrated in full lines in FIG. 2–A, showing one of the top switch cams 45A locked up.

The aforesaid dead-center locking feature is provided for both closures, and hence is present in both cams 46B and 45A respectively associated with each of the motors and the corresponding switch 56B and 55A, said switches in each instance being the stopping switches which stop the top and bottom motors 36 and 35 at the end of their respective operating cycles.

Operation

The operation of the brewer, as employed in a coin-controlled or automatic coffee dispensing machine, is described in view of FIG. 7 which depicts schematically certain components of such a machine for purposes of explanation, including a source of hot water in the form of an electrically heated reserve tank 80 adapted to receive cold water via connection 81 from a small elevated header tank 82, which in turn receives its supply of water through an electromagnetically controlled valve means 83 connecting to the water mains 84. The valve 83 is level-controlled by a float switch 85 in circuit with the valve operating coil 83A and the A.C. power source.

Any volume of hot water withdrawn from the reserve tank 80 is automatically replaced by a like volume from the header tank via line 81. In addition, flushing water at full mains pressure is directly connected via line 86 and a solenoid valve 87, and hose connection 88 to brewer chamber nipple 20.

Brewing water is passed to the nipple 20 from tank 80 by the solenoid brew valve 89 and duct 90.

Brewed coffee is stored in substantial volume in a bulk reserve tank 39X. Whenever the master vending mechanism is operated to deliver a cup of coffee, a test switch 91 is closed to test the level in the reserve through the agency of a level sensing switch 92, as will be further described.

During the brewing cycle the extraction passes from the outlet 39 at the bottom of the brewing chamber to the storage tank indicated schematically at 39X, FIG. 7, in which a conventional electrolytic or other level control means 92, connected in series with a brew relay 93 and transformer 94 to the power supply, operates in such manner that when the reserve level of coffee falls below a predetermined value, test switch 91 operates relay 93 whose contacts 95 close to apply power via conductor 96 to start the brew timer motor 97, and the latter will rotate its index cam 98 to close the cycle or index switch 99 and provide a shunt holding circuit for energizing motor 97 for its duty cycle independently of the level control means 92.

At the time any brewing cycle is initiated by the supply level sensing switch 92, as aforesaid, the bottom closure 16A will be standing open at the 30° drain position, and the top closure 15A will be in the closed condition, said closures having been left standing in these respective conditions at the conclusion of the preceding brew cycle, so that the first thing to happen, after the brew timer motor 97 starts in each new cycle, is the "completion" of the closing of the bottom member, which is effected by energizing drain motor 36 via conductor 114, drain motor cam switch contacts 56B, conductor 129, and brewer timer switch contacts 130, contacts 56B opening to stop motor 36.

In the meanwhile, the top closure 15A will be opened by energization of the top cover motor 35 via power conductor 119, brewer timer contacts 117 closed, conductor 116, tops cover motor cam switch contacts 55B closed, conductor 115, until the timer contacts 117 open again, whereupon a charge of fresh, granulated coffee will be released under control of cam switch contacts 55BX from a hopper means not shown.

According to FIG. 7, the top closure remains open when its motor is stopped by the slot on cam 45B opening switch 55B; and following the charging of the coffee into the chamber 14, as aforesaid, the brew cycling cam 118 will transfer the top closure motor circuit from contacts 117 to contacts 120 and the cover motor 35 will complete its closing cycle by further energization from conductor 121, cover motor cam switch 55A, and conductor 115. Motor 35 will again stop when the notch in cam 45A is returned to open switch 55A, as in FIG. 7.

Following sealing of the top, the brew water valve 89 will be opened by closure of cam switch 106, the cam 105 actuated by the cycling motor 97, and a predetermined volume of brew water will be passed into the brew chamber 14 via the head 70 at the lower pressure value, which exists by reason of the lower static head maintained in the heating tank, this low pressure being sufficient only to trickle the water through the header cup 73 for centralized distribution into the fresh charge of granular coffee, indicated by dashed lines X—X.

At the conclusion of the time interval allowed for brewing (about two minutes) the extraction will have drained out through the discharge line 39 into the brew storage tank 39X, and at this juncture the bottom or drain motor 36 will be started as a result of closure of contacts 130 by the brew timer cam 132, which will apply power via conductor 131, and cam switch 56A to said motor, and as previously mentioned, the latter will operate first to open the bottom closure 16A fully to the dotted-line position shown in FIG. 7, as a result of which the major bulk of the spent grounds will at once drop out of the chamber into a suitable waste receptacle (not shown), and the closure member will continue back toward closed position, but will be arrested at the 30° drain position shown in full lines, whereupon the drain motor 36 will be stopped by opening of cam switch 56A.

The bottom will remain in the angular position until another brewing cycle is initiated (i.e. to close 16A through timer switch contacts 133 and cam switch 56B).

Meanwhile, the flushing valve 87 will be opened by closure of switch 101 by cam 100 on the brewer timer shaft, thereby admitting water at full mains pressure into the spray head 70 to unseat the control plate or disc 72 and cause a wide spray to wash down the inner surfaces of the strainer insert 42 and at the same time the inner surface of the bottom closure 16A will be washed and cleared of any residual grounds by reason of its angular attitude beneath the outflowing flushing water.

The washing operation is terminated by arrival of cam 100 back at the starting position shown in FIG. 7, but the bottom member will remain in the partly open angular drain position until another brewing cycle is called for.

The spray thrown from head 70 at higher pressures is diffused upwardly and outwardly to wash the lid as well as the sides.

I claim:

1. A beverage brewing device comprising a container open at opposite ends and mounted with said ends in upper and lower vertical alignment; a pivoted closure for each end, a hot water intake connection carried by and leading through the upper closure; a cyclic crank mechanism having a dead-center position for opening and closing each closure, said dead-center positions respectively corresponding to the fully closed conditions of the corresponding end closures; independent electric motor means drivingly connecting with each crank mechanism for actuating the same in a cycle to open and close the corresponding closure; together with control-circuit means including a starting switch and a stopping switch for connecting and disconnecting power to each motor, and means operatively associated with each closure for actuating the appertaining stopping switch at a time when the corresponding crank mechanism is in said dead-center condition.

2. In a beverage brewer, a brewing tank having at least one open end, a pivoted closure for said end, motor and crank means for opening and closing said closure, and a combination flushing and infusion water head mounted centrally of said closure for movement therewith upon closing into a position concentric with the tank and including an external nipple for connection to a hot water line, a member situated in the path of water from said nipple through said head for distributing water at a predetermined low pressure to trickle centrally into the tank, and a member movable relative to said first-mentioned member having a normal position at said predetermined low pressure and a further position into which it is moved by water at a predetermined higher pressure to direct flushing water outwardly onto the interior portions of said tank, and means for feeding hot water to said head selectively at said pressures.

3. In a device of the class described the combination, with a brewer tank of the type having pivoted end closures adapted to seat against gaskets thereon, of crank means connected with each closure for cyclic operation to open and close the respective closures, motor means for actuating said crank means, and circuit connections for actuating said motor means and including a switch operable to effect the starting and stopping thereof, cam means actuated by said motor means cooperable with said switch means, said cam means including a notch and said switch means including an operating member therefor adapted to move into said notch to stop said motor means with at least one of said closures in closed condition, said notch and operating member forming a back lock to prevent retrograde motion of the cam means, and said crank means having a dead center position when the appertaining closure means is in closed condition and back locked by the aforesaid notch and operating member whereby to hold the closure means securely in closed condition.

4. In a beverage brewing apparatus, a tank having opposite open ends each provided with a movable closure; motor means operable to open and close said closures in a predetermined sequence; a water-distributing head carried on one of said closures to enter said tank on closing; means connecting said head to a source of water having a relatively high- and a relatively low-pressure supply; and valve means connecting between said source and head and operable selectively to admit water at either of said pressures from said supplies; said head being constructed to direct the water at the higher pressure onto substantial areas of the interior of said tank for flushing, and to direct the water at the lesser pressure into a median region of the tank; and means cooperable with said motor means and valve means for actuating the latter to admit water at the higher pressure only when said bottom closure is opened to a certain position, and to admit water at said lower pressure when both closures are closed and at a predetermined time following said low-pressure admittance in said first-mentioned predetermined sequence.

5. In a beverage brewer, a tank open at opposite ends; a movable closure for each end; and motor-driven means operable to open and close said closures and back-lock the same in a dead-center condition, said means comprising: an operating leverage for each closure; motor-driven crank means for each leverage, and pivotal connections between each closure and appertaining leverage and crank affording a dead-center relation, together with a member jointly rotatable with each crank and having a radially-located notch with a yieldable detent member located relative thereto to enter and back-lock the same against retrograde motion in the dead-center relation.

6. In a beverage brewer, a tank open at opposite sides; a movable closure for each side; separate unidirectionally-driven motor means for each closure; a driving linkage connecting each closure with the appertaining motor means, each said linkage having a substantially dead-center locking condition of rest corresponding to the closed condition of the appertaining closure; and means for starting and stopping said motor means in a certain sequence in operating cycles in which the stopping phase leaves said linkages respectively in said substantially dead-center locking condition.

7. Apparatus according to claim 6 in which the said motor means for each closure is an electric motor energized to drive in one direction, and each provided with control switch means and appertaining-cam means driven thereby for actuating the corresponding switch means, and said starting and stopping means includes circuit means connected with and controlled by said switch means and certain starting and stopping switch means for effecting the aforesaid operating cycles.

8. Apparatus according to claim 7 further characterized in that said cam means is provided respectively with a locking notch means located to correspond to the appertaining dead-center locking condition of the corresponding linkage means, and the cam-actuated switch means cooperating therewith in each instance has an operating member engageable with the appertaining cam-locking notch to engage therewith in said dead-center condition whereby to lock the corresponding cam means and appertaining closure means against retrograde movement out of dead-center closed condition, except in response to the driving effort of said motor means.

9. In a beverage brewing tank, a pivoted closure provided with resilient sealing gasket means; an actuating crank means movable unidirectionally for opening and closing the closure, and a leverage means having pivotal connection with the closure and the crank means so aligned as to be movable into and beyond a dead-center alignment when the crank means is turned into a predetermined angular position corresponding to a closed condition of the closure, whereby to afford an optimum seal through the agency of said gasket means.

10. Apparatus according to claim 9 further characterized by the provision of a unidirectionally driven electric motor coupled to said crank means to rotate the same in closure-opening and closing movement; an operating circuit including switch means for starting said motor; and further switch means in said circuit and controlled by a control member moved in step with said crank means to stop said motor with the crank means in the aforesaid dead-center condition.

11. Apparatus according to claim 10 in which said control member is rotatable and has a radially-located notch with a back-stopping formation, and said further switch means has a riding member enterable into said notch and acting against said back-stopping formation in the said dead-center condition to prevent movement of the rotatable member backwardly away from said dead-center condition or stoppage as aforesaid.

12. In an upright brewer tank having at least a bottom opening and closure therefor, a combination water-injection and clean-out head mounted centrally of the tank near the top thereof, said head having a central downwardly-directed water passage and means for connecting same with a source of water of at least two degrees of pressure, said passage having an outlet at a lower end region thereof; an upwardly-opening cup member mounted opposite said lower end region of the passage and having upstanding side-wall portions circumambient of said end region and outlet passage thereat, such that water under a first and relatively lower one of said pressures will be directed into the cup member and tend to flow over the margins of said wall portions and thence in a downward direction centrally of said tank for trickle infusion purposes; said head including a deflecting means movably disposed above said cup and margins thereof and at a level above said outlet passage and having radially outward portions normally resting down in close proximity to said cup margins permitting passage of infusion water at said first pressure, said deflecting means being moved away from said cup margins responsive to water acting thereagainst at a second and higher one of said pressures sufficient to cause such water to move in a direction radially outward toward the walls of said tank; said deflecting means having circumambient marginal portions directed to deflect the last mentioned water in a predetermined pattern toward the tank walls as aforesaid.

References Cited in the file of this patent

UNITED STATES PATENTS

| | | |
|---|---|---|
| 1,130,561 | Amiss | Mar. 2, 1915 |
| 1,195,858 | Ruhe | Aug. 22, 1916 |
| 1,238,209 | Smith | Aug. 28, 1917 |
| 1,405,315 | Moore | Jan. 31, 1922 |
| 1,556,026 | Pouget | Oct. 6, 1925 |
| 1,680,792 | Kleinlercher | Aug. 14, 1928 |
| 1,757,628 | Hale | May 6, 1930 |
| 1,846,514 | Drake | Feb. 23, 1932 |
| 2,012,454 | McDermet | Aug. 27, 1935 |
| 2,407,482 | Doyle | Sept. 10, 1946 |
| 2,413,488 | Draeger | Dec. 31, 1946 |
| 2,447,692 | Evensen | Aug. 24, 1948 |
| 2,530,002 | Coy | Nov. 14, 1950 |
| 2,558,220 | McLachlen | June 26, 1951 |
| 2,583,234 | Russell | Jan. 22, 1952 |
| 2,601,566 | Soderquist | June 24, 1952 |
| 2,734,668 | Gardes | Feb. 14, 1956 |
| 2,750,871 | Landgraber et al. | June 19, 1956 |
| 2,801,087 | Hawk | July 30, 1957 |
| 2,827,845 | Richeson | Mar. 25, 1958 |
| 2,849,944 | Prickett et al. | Sept. 2, 1958 |
| 2,890,838 | Jannsen | June 16, 1959 |
| 2,895,402 | Totten | July 21, 1959 |
| 2,901,184 | Kane | Aug. 25, 1959 |

UNITED STATES PATENT OFFICE
CERTIFICATE OF CORRECTION

Patent No. 3,103,159                  September 10, 1963

Charles T. Breitenstein

It is hereby certified that error appears in the above numbered patent requiring correction and that the said Letters Patent should read as corrected below.

Column 1, line 66, for "cross-sectional" read -- cross-section --; column 5, line 16, for "tops" read -- top --; column 8, line 8, for "or" read -- on --.

Signed and sealed this 14th day of April 1964.

(SEAL)
Attest:

ERNEST W. SWIDER

Attesting Officer

EDWARD J. BRENNER

Commissioner of Patents